Dec. 6, 1960   T. R. CURRAN   2,962,722
MASK WITH INTERNAL SUPPORTS FOR SPECTACLES
Filed Jan. 20, 1959
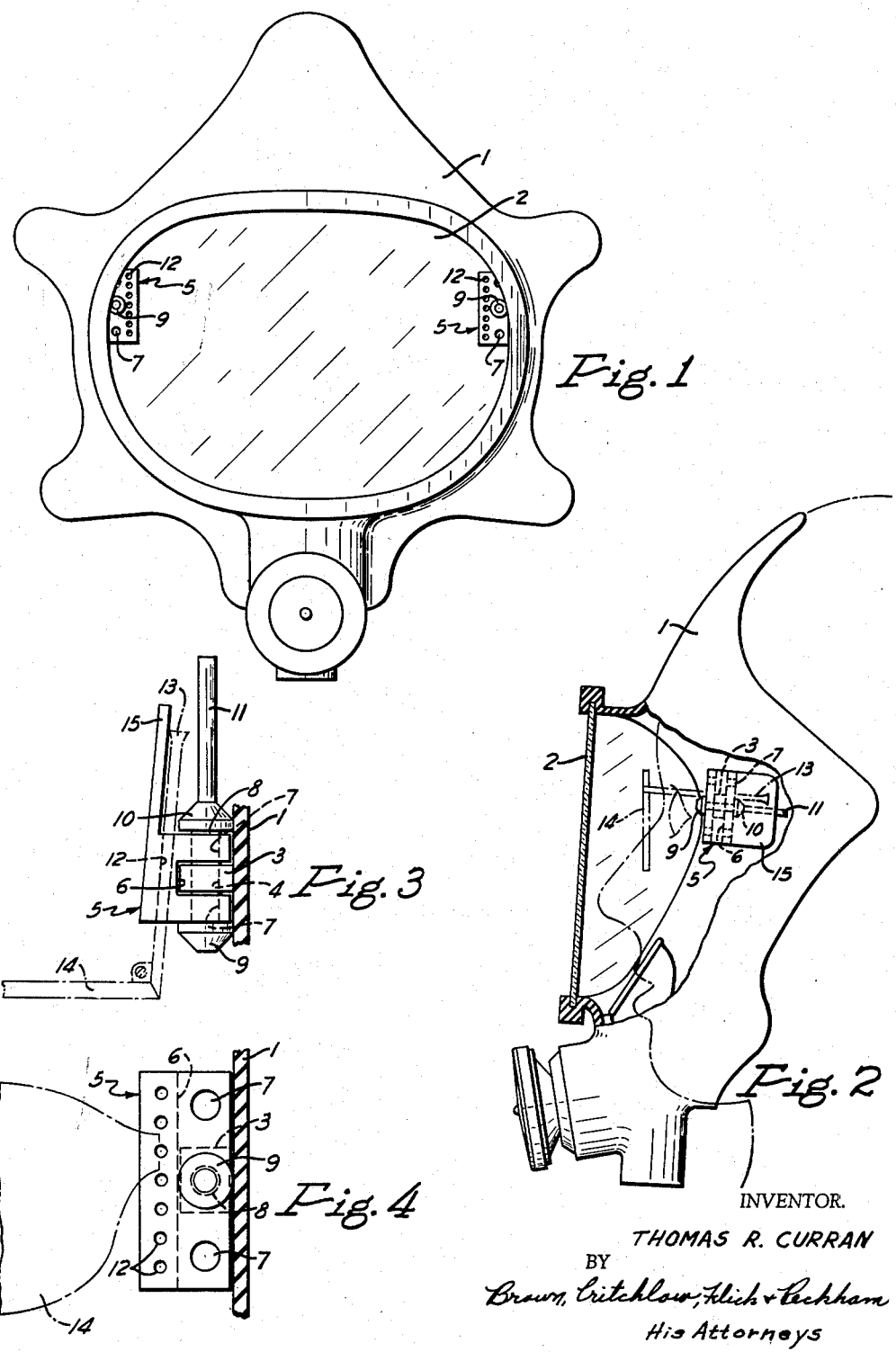
INVENTOR.
THOMAS R. CURRAN
BY
His Attorneys

United States Patent Office 2,962,722
Patented Dec. 6, 1960

2,962,722

MASK WITH INTERNAL SUPPORTS FOR SPECTACLES

Thomas R. Curran, Pittsburgh, Pa., assignor to Mine Safety Appliances Company, Pittsburgh, Pa., a corporation of Pennsylvania Filed Jan. 20, 1959, Ser. No. 787,989

7 Claims. (Cl. 2—14)

This invention relates to masks, such as gas masks and the like, and more particularly to those provided with supports for prescription glasses.

For those who must wear spectacles at all times, the wearing of a face mask presents a problem. Most all prescription glasses nowadays are held in place on the head by temples that extend from the frames back to the ears. If a gas mask is put on, the temples of the spectacles will interfere with the seal that should exist between edges of the mask and the sides of the head. It has therefore generally been necessary to remove the glasses before donning a mask, even though the vision of the wearer may then be seriously impaired.

It is among the objects of the invention to provide a mask, in which there are supports for prescription glasses, in which the supports are adjustable vertically, in which the glasses can be adjusted vertically relative to the supports, in which the supports also protect the sides of the head from possible injury by the temples of the glasses, and in which the major portions of the supports can be removed from the mask if the person wearing it does not require glasses.

In accordance with this invention, the inside of a mask is provided at each side with an inwardly projecting lug located at about eye level. Each lug is engaged by a bracket, which is connected to it by detachable means so that the bracket can be removed if desired. The brackets are provided with holes in them, extending from front to back, for receiving stub temples of spectacles in order to support the spectacles. Means are provided which will permit the spectacles to be disposed at different levels in the mask to suit the individual user. This is accomplished by a plurality of vertically spaced holes through the brackets. The holes may be those that will receive the stub temples or they may be openings that receive removable fastening members connecting the brackets to the lugs. Preferably, there are groups of both types of holes to permit greater adjustability.

The preferred embodiment of the invention is illustrated in the accompanying drawings, in which Fig. 1 is a front view of a mask, showing spectacle supporting brackets behind the lens;

Fig. 2 is a side view of such a mask as applied to the face of a wearer, with a portion of the mask broken away to show the spectacles support at the opposite side;

Fig. 3 is an enlarged fragmentary horizontal section through one side of the mask, showing the spectacles support from above; and Fig. 4 is a front view of the support shown in the preceding figure.

Referring to the drawings, a mask of any desired form can be used. It may be a full mask that covers the entire face or a half mask that covers only the eyes and nose. A full mask is illustrated. The mask includes a facepiece 1 that may be provided with two laterally spaced lenses or with one large lens 2, the latter being shown in the drawings. The facepiece is held in sealing engagement with the head by suitable head straps (not shown).

It is a feature of this invention that spectacles may be worn with this mask without impairing the seal between it and the head. Accordingly, at each side of the mask a lug 3 projects inwardly from its inner surface, with which they may be integral. The lugs are located at what would be eye level for the average person wearing the mask. The exact level is not important, in view of the adjustments that will be described later. Each lug is provided with an opening 4 that extends through it from front to back. Detachably connected to each lug is a bracket 5 that most suitably is made of rubber or a similar yieldable material. Preferably, the bracket is provided with a vertically extending slot 6, which opens outwardly toward the adjacent side of the facepiece. The slot is just wide enough to receive a lug 3. The central portion of the bracket is provided at opposite sides of the lug with openings 7 that are aligned with the opening through the lug. A fastening member extends through the three openings to connect the bracket to the lug. The fastener is removable so that the bracket can be removed in case the wearer of the mask does not need glasses.

A preferred type of fastener has a cylindrical rubber stem 8, with flexible heads 9 and 10 at its opposite ends substantially engaging the front and back of the bracket. Projecting axially from the rear head 10 is a tail 11 that is longer than the distance from front to back of the bracket body. To insert the fastener, the tail is passed rearwardly through the aligned openings and then its rear end is pulled in order to compress and pull the rear head through the bracket and lug until the head can expand behind the bracket. The fastener can be removed in the same way by pulling it hard enough to compress or deform the front head so that it will pass back through the openings in the bracket and lug. As it is desirable that the bracket be adjustable vertically in the mask, it is provided with another set of openings 7 above or below the lug, and preferably in both locations. By aligning the upper openings with the lug opening, the bracket will be lower in the mask, while aligning the lower openings with the lug opening will raise the bracket.

Just inwardly of the lug and slot, each bracket is provided with at least one small hole 12 extending from front to back. The hole is slightly smaller than the stub temples 13 of prescription glasses that are to be worn with the mask. A stub temple is a temple that has been cut off or originally made short, so that it will extend backward from the frame 14 of the spectacles only a short distance to prevent it from interfering with the seal between the side edges of the mask and the head. A stub temple is inserted in a bracket hole 12. The distance between the frame 14 and the lens of the mask can be adjusted by merely sliding the temples backward or forward a short distance in the two brackets. The rear ends of the temples may be flared to prevent them from accidentally sliding forward out of the brackets. Although the level of the glasses in the mask can be adjusted roughly by moving the brackets up or down the lugs, a finer adjustment is provided by using a plurality of holes 12 spaced vertically. These holes are quite close together, so that it should always be possible to position the glasses at the right level for the person wearing the mask.

To avoid any danger of the free rear ends of the temples being jabbed into the sides of the head in case something strikes the sides of the mask, the inner side of each bracket may be provided with a rearwardly projecting guard flange 15, which will space the temples from the head and thus protect the head.

It will be seen that with this invention a wearer of a mask does not have to go without his glasses, and that he can wear them comfortably inside the mask without interfering with the seal that the mask must have with the head.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. The combination with a mask having a lens in its front, of a lug at each side of the mask integral therewith and projecting inward at about eye level, a bracket engaging each lug, and means for detachably connecting the brackets to the lugs, the brackets being provided with holes through them from front to back adapted to receive stub temples of spectacles to support the spectacles.

2. The combination with a mask having a lens in its front, of a lug at each side of the mask projecting inward at about eye level, a bracket engaging each lug, and means for detachably connecting the brackets to the lugs, each bracket being provided with a plurality of vertically spaced holes through it from front to back adapted selectively to receive a stub temple of spectacles to support the temple at different levels relative to the mask.

3. The combination with a mask having a lens in its front, of a lug at each side of the mask projecting inward at about eye level, a bracket engaging each lug, and means for detachably connecting the brackets to the lugs, the inner side of each bracket having a rearwardly extending guard flange, and each bracket being provided with a hole through it from front to back between its flange and the adjacent side of the mask for receiving a stub temple of spectacles to support the temple.

4. The combination with a mask having a lens in its front, of a lug at each side of the mask projecting inward at about eye level and having an opening through it from front to back, a bracket engaging each lug and provided with an opening registering with the opening in the adjoining lug, and removable fasteners extending through the registering openings to connect the brackets to the lugs, the brackets being provided with holes through them from front to back adapted to receive stub temples of spectacles to support the spectacles.

5. In the combination recited in claim 4, each bracket having a plurality of said fastener-receiving openings spaced vertically for selective registration with said lug opening to hold the brackets at different levels relative to the mask.

6. In the combination recited in claim 4, each bracket having a bifurcated portion straddling the adjoining lug.

7. The combination with a mask having a lens in its front, of a lug at each side of the mask projecting inward at about eye level and having an opening through it from front to back, a pair of brackets, each bracket being provided with a vertical slot receiving one of said lugs, the front and back of the bracket having aligned openings therethrough registering with the lug opening, and removable fasteners extending through the registering openings to connect the brackets to the lugs, the inner side of each bracket having a rearwardly extending guard flange, and each bracket being provided between its flange and slot with a plurality of vertically spaced holes adapted selectively to receive a stub temple of spectacles.

References Cited in the file of this patent

UNITED STATES PATENTS

| | | |
|---|---|---|
| 2,224,560 | Wentz | Dec. 10, 1940 |
| 2,388,713 | Schutz | Nov. 13, 1945 |
| 2,427,469 | Morley | Sept. 16, 1947 |